Figure 1:
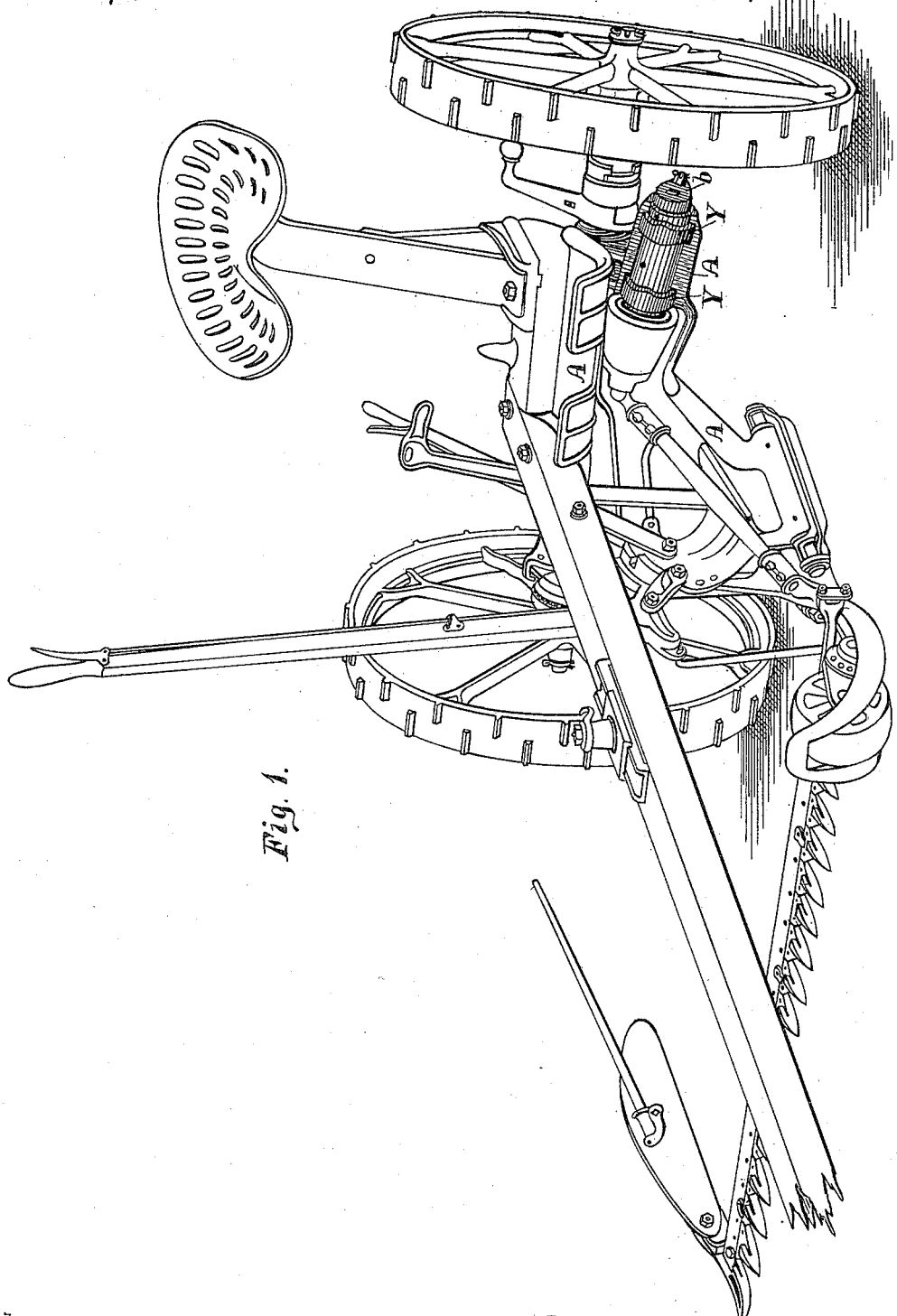

(No Model.)  2 Sheets—Sheet 1.

W. N. WHITELEY.
BEARING FOR HARVESTER FRAMES.

No. 330,181.  Patented Nov. 10, 1885.

Witnesses:  Inventor:

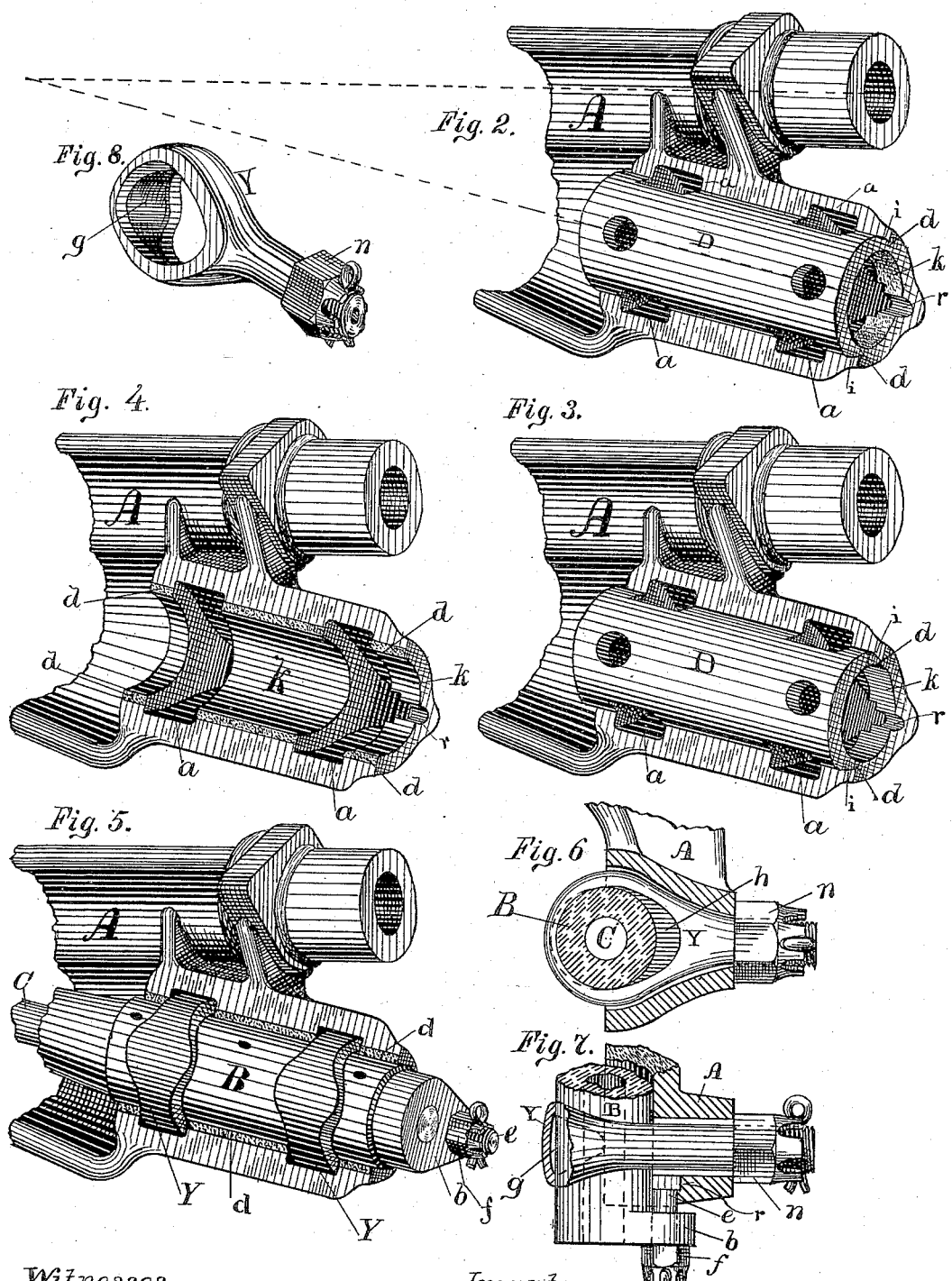

UNITED STATES PATENT OFFICE.

WILLIAM N. WHITELEY, OF SPRINGFIELD, OHIO.

BEARING FOR HARVESTER-FRAMES.

SPECIFICATION forming part of Letters Patent No. 330,181, dated November 10, 1885.

Application filed September 17, 1885. Serial No. 177,554. (No model.)

*To all whom it may concern:*

Be it known that I, WM. N. WHITELEY, of Springfield, county of Clark, State of Ohio, have invented a new and useful Improvement in Bearings for Harvester-Frames, of which the following is a specification.

Heretofore when it has been desired to employ separable tubular boxes or bushings in harvesting-machines it has been customary to fit said bushings into a cell bored out in the frame or to prepare a half-cylindrical seat with a milling or planing tool and secure the bushing by means of a removable cap or yoke. The first-named is objectionable because of the difficulty in removing the bushing when worn so as to need replacing. The second is objectionable because of the expense and difficulty in milling and planing out the half-cylindrical seat.

My invention relates to that class of harvesters which have cast-metal frames, and obviates the objection above named by casting the frame with a cylindrical seat, which is bored out in the way heretofore practiced, and subsequently has the top removed by breaking or otherwise, so as to change the cylindrical seat to a half-cylindrical seat, into which the cylindrical bushing may be laid and secured by a removable cap or yoke, thus securing the accuracy and cheapness of boring the seat with the facility of assembling or repairing the wearing-surfaces.

Figure 1 is a perspective of a harvester having my bearings applied thereto. Fig. 2 is a perspective view of that portion of the frame containing the bearing as it is cast or formed. Fig. 3 shows the same after being bored out. Fig. 4 is the same after the removal of a part to form the seat of the box or bearing. Fig. 5 shows the bearing clamped in and the shaft in its place. Fig. 6 is a cross-section through bearing, shaft, &c. Fig. 7 is a horizontal section through bearing, &c. Fig. 8 is a perspective view of one of the yokes for clamping the bearing in place.

Similar letters refer to like parts in the several views.

The construction of a harvester-frame with my improvement is as follows—viz: That portion of the harvester-frame A which is to contain the bearing has formed on it a cylindrical case, D, with an interior space, $k$, considerably larger than the shaft C, while at right angles to this is one or more recesses, $a\ a$, cored through at the back and large enough to admit the yokes Y Y when complete. The case D is now bored out true and in proper line, as seen in Fig. 3. The casting having been cast or formed quite thin along the sides of said case, as shown at $i$, an expanding mandrel or other suitable tool is placed in the hole and the front half, D, is broken off on the lines $d\ d\ d\ d$, Fig. 4, leaving a semicircular seat, $k\ k$, Fig. 4, to which the box B is turned and fitted. The box B is a cylinder turned on the outside and bored out inside to fit the shaft C. The seat is also provided with a recess to receive the head of the bolt $e$ below the box B, and upon the end of the box B is an offset, $b$, through which the bolt $e$ passes, and has on it the nut $f$, for the purpose of holding the box B secure from any tendency to lateral motion. The box B is secured to the frame A by one or more yokes, Y Y, constructed with widened fronts, recessed, as shown at $g$, Figs. 7 and 8, thus forming a bearing only on the edges, whereby greater rigidity is secured when the nuts $n$ at the back are firmly screwed up, as shown in Fig. 6. At the back of the box B the holes through the yokes Y Y are cut away in a semi-elliptic form, leaving the space $h$ between the box B and yoke Y, Fig. 6, so that there shall be no contact between the two at that point.

It is found in practice that by constructing a recess for the box B so that it can be bored out, and afterward the front portion broken away or otherwise removed, is a much quicker, easier, and cheaper method than milling or planing would be, and at the same time a greater certainty of making a good fit.

In Fig. 1 is shown a perspective view of a mower with the angular shaft fitted in a box constructed after my method of fastening.

I claim—

1. A half-cylindrical or open seat for a cylindrical box or bush-bearing, constructed, first, as a cylindrical case, then bored out true and in proper line, and then the top or cap of said case broken away, as set forth.

2. A frame, A, made with the hollow shell D and grooves $d\ d$ longitudinally along the opposite side of the same, whereby the removal of the top or cap of said shell is facilitated.

3. A frame, A, made with the hollow shell D and recesses $a\ a$, and grooves $d\ d$, whereby the seat for the bushing may be bored and the bushing secured by yokes, as set forth.

In testimony whereof I have hereunto set my hand this 10th day of September, 1885.

WILLIAM N. WHITELEY.

Witnesses:
F. B. FURNISS,
B. P. TURNER.